(12) United States Patent
Chen et al.

(10) Patent No.: US 9,973,876 B2
(45) Date of Patent: May 15, 2018

(54) APPLICATION RECOMMENDATIONS

(71) Applicant: Nokia Technologies Oy, Espoo (FI)

(72) Inventors: Canfeng Chen, Beijing (CN); Jia Liu, Beijing (CN)

(73) Assignee: Provenance Asset Group LLC, Essex, CT (US)

( * ) Notice: Subject to any disclaimer, the term of this patent is extended or adjusted under 35 U.S.C. 154(b) by 0 days. days.

(21) Appl. No.: 14/768,750

(22) PCT Filed: Mar. 20, 2013

(86) PCT No.: PCT/CN2013/072948
§ 371 (c)(1),
(2) Date: Aug. 18, 2015

(87) PCT Pub. No.: WO2014/146266
PCT Pub. Date: Sep. 25, 2014

(65) Prior Publication Data
US 2016/0007136 A1    Jan. 7, 2016

(51) Int. Cl.
*G01R 31/08* (2006.01)
*H04B 7/00* (2006.01)
(Continued)

(52) U.S. Cl.
CPC ............ *H04W 4/003* (2013.01); *H04L 67/16* (2013.01); *H04W 4/008* (2013.01); *H04W 4/06* (2013.01);
(Continued)

(58) Field of Classification Search
CPC . H04L 47/10; H04L 12/5602; H04Q 11/0478; H04B 1/56
See application file for complete search history.

(56) References Cited

U.S. PATENT DOCUMENTS

| 6,856,673 B1 | 2/2005 | Banks et al. |
| 2001/0043573 A1 | 11/2001 | Kelly |

(Continued)

FOREIGN PATENT DOCUMENTS

| CN | 1705245 A | 12/2005 |
| CN | 101212240 A | 7/2008 |

(Continued)

OTHER PUBLICATIONS

International Search Report and Written Opinion received for corresponding Patent Cooperation Treaty Application No. PCT/CN2013/072948, dated Jan. 2, 2014, 13 pages.
(Continued)

*Primary Examiner* — Brian Roberts
*Assistant Examiner* — Abu-Sayeed Haque
(74) *Attorney, Agent, or Firm* — Dinsmore & Shohl LLP

(57) ABSTRACT

Disclosed is apparatus configured: to create an advertising message including a packet data unit [PDU] including information identifying an application that may be installed on the apparatus and an indication that the PDU may include an application recommendation; and to cause the advertising message to be broadcast. Another apparatus is configured: to receive an advertising message including a packet data unit [PDU] including information identifying an application that may be installed on another apparatus and an indication that the PDU may include an application recommendation; and to use the information identifying an application to provide an option to install the application.

20 Claims, 5 Drawing Sheets

(51) Int. Cl.
*H04J 3/00* (2006.01)
*H04W 4/00* (2018.01)
*H04W 4/20* (2018.01)
*H04W 4/06* (2009.01)
*H04W 52/02* (2009.01)
*H04L 29/08* (2006.01)

(52) U.S. Cl.
CPC ....... *H04W 4/206* (2013.01); *H04W 52/0229* (2013.01); *Y02B 60/50* (2013.01)

(56) References Cited

U.S. PATENT DOCUMENTS

| | | | |
|---|---|---|---|
| 2002/0184096 A1 | 12/2002 | Kawahara et al. | |
| 2007/0001904 A1 | 1/2007 | Mendelson | |
| 2008/0109302 A1* | 5/2008 | Salokannel | G06Q 30/02 705/14.1 |
| 2008/0130639 A1* | 6/2008 | Costa-Requena | G06F 8/65 370/389 |
| 2010/0100615 A1 | 4/2010 | Lee et al. | |
| 2010/0306044 A1 | 12/2010 | Martin-Cocher et al. | |
| 2011/0212712 A1 | 9/2011 | Abdel-Kader | |
| 2012/0052802 A1* | 3/2012 | Kasslin | H04W 48/12 455/41.2 |
| 2012/0110568 A1 | 5/2012 | Abel et al. | |
| 2012/0117400 A1 | 5/2012 | Vandwalle et al. | |
| 2012/0122443 A1* | 5/2012 | Nakahara | G06F 9/4443 455/418 |
| 2012/0173318 A1* | 7/2012 | Lee | G06Q 30/0241 705/14.4 |
| 2012/0196534 A1* | 8/2012 | Kasslin | H04W 4/06 455/41.2 |
| 2012/0258665 A1* | 10/2012 | Sip | H04W 84/18 455/41.2 |
| 2013/0178163 A1* | 7/2013 | Wang | H04W 4/008 455/41.2 |
| 2013/0297422 A1* | 11/2013 | Hunter | G06Q 30/0261 705/14.58 |
| 2014/0188348 A1* | 7/2014 | Gautama | B60W 10/30 701/48 |
| 2014/0243046 A1* | 8/2014 | Steely | G06F 21/6254 455/566 |
| 2015/0133054 A1* | 5/2015 | Chen | H04W 74/002 455/41.2 |
| 2015/0271625 A1* | 9/2015 | Chen | H04W 4/008 370/328 |
| 2015/0289083 A1* | 10/2015 | Tsai | H04B 5/00 455/41.1 |
| 2015/0319579 A1* | 11/2015 | Syrjarinne | G01C 21/20 455/456.1 |

FOREIGN PATENT DOCUMENTS

| | | |
|---|---|---|
| CN | 101384011 | 3/2009 |
| CN | 102662679 | 9/2012 |
| CN | 201668510 | 9/2012 |
| EP | 1322071 A2 | 6/2003 |
| EP | 2341359 A1 | 7/2011 |
| EP | 2400714 A1 | 12/2011 |
| GB | 2353910 A | 3/2001 |
| WO | 2004/032019 A2 | 4/2004 |
| WO | 2007/034281 A1 | 3/2007 |
| WO | WO2011087638 | 7/2011 |

OTHER PUBLICATIONS

"IEEE Standard for Local and Metropolitan Area Networks: Overview and Architecture", IEEE Standards 802-2001, Feb. 7, 2002, 47 Pages.
"One! Best Recommendations", Android Apps, Retrieved on Dec. 14, 2016, Webpage available at : http://android-apps.com/apps/one-best-recommendations/.
"Android App Recommendation", 9Apps, Retrieved on Dec. 14, 2016, Webpage available at : http://www.9apps.com/android-apps/Android-App-Recommendation/.
"Bluetooth Specification V4.0", Specification of the Bluetooth system, Jun. 30, 2010, 2302 pages.
"Bluetooth Assigned Numbers", Bluetooth, Version 1.1, Feb. 22, 2001, 30 pages.
"Manifest", Android Developers, Retrieved on Dec. 5, 2016, Webpage available at : https://developer.android.com/guide/topics/manifest/manifest-element.html#package.
"Linking to Your Products", Android Developers, Retrieved on Dec. 6, 2016, Webpage available at : https://developer.android.com/distribute/tools/promote/linking.html#PerformingSearch.
"Link to your app", Microsoft, Retrieved on Dec. 6, 2016, Webpage available at : https://msdn.microsoft.com/windows/uwp/publish/link-to-your-app.
International Search Report and Written Opinion received for corresponding Patent Cooperation Treaty Application No. PCT/CN2012/078599, dated Apr. 25, 2013, 10 pages.
International Search Report and Written Opinion received for corresponding Patent Cooperation Treaty Application No. PCT/IB2012/056723, dated Aug. 22, 2013, 13 pages.
Non-Final Office action received for corresponding U.S. Appl. No. 14/414,416, dated Feb. 26, 2016, 16 pages.
"Covered Core Package Version: 4.0 Specification Volume 1", Specification of the Bluetooth System, Version 4.0, vol. 1, Jun. 30, 2010, 140 pages.
Extended European Search Report received for corresponding European Patent Application No. 12880961.3, dated Mar. 9, 2016, 10 pages.
Final Office action received for corresponding U.S. Appl. No. 14/414,416, dated Sep. 29, 2016, 24 pages.
Extended European Search Report received for corresponding European Patent Application No. 13878655.3, dated Oct. 11, 2016, 7 pages.
English Language Machine Translation of Chinese Patent Application Publication No. CN201668510, published on Sep. 12, 2012, 40 pages.
Chinese Search Report of Chinese Patent Application No. 2013800748764, dated May 22, 2017, 2 pages.

* cited by examiner

APPLICATION RECOMMENDATIONS

RELATED APPLICATION

This application was originally filed as PCT Application No. PCT/CN2013/072948 filed Mar. 20, 2013.

FIELD

The present application relates to application recommendations.

BACKGROUND

Applications are usually of interest to mobile users. Apart from random searching, a user in many cases would like to install applications according to recommendations by others, particularly by friends and colleagues but also by reviewers, bloggers, etc. For example, in local scenarios where people gather together, they may be curious in finding interesting applications in friends' mobile phones and sharing with each other those they would like to have.

In mobile platforms, most applications are not such simple portable software, though. The user usually has to download the installation file of the program and perform a new installation even it is already installed in friend's mobile device and even if the application is free (i.e. the cost is zero). In practice, getting the recommended application from others commonly involves following steps: 1) getting the name of the application; 2) launching an application market or store; 3) inputting the Application Name and starting searching; 4) screening the results for the targeted application and, finally, 5) selecting a 'download' or 'install' option. Some users may find this process to be inconvenient.

Some smartphones provided by Nokia, including the Lumia 920, provide a mechanism for sharing installed applications with other devices by NFC, email or social networks, which many users may find to be more convenient. An application is shared by providing a link to the application on the Windows Store. Application sharing by NFC is point-to-point in that a target device needs to be tapped onto the donor device (i.e. they need to be in contact. Application sharing by email or social network requires a data connection to the Internet to succeed, and so is not possible in situations when a connection to the Internet is not possible, and may incur data usage costs for the user.

SUMMARY

Various aspects of examples of the invention are set out in the claims.

A first aspect of the invention provides apparatus configured:
  to create an advertising message including a packet data unit [PDU] including information identifying an application that may be installed on the apparatus and an indication that the PDU may include an application recommendation; and
  to cause the advertising message to be broadcast.

The information identifying an application may comprise a unique identifier for the application. The information identifying an application may comprise a full name of the application or it may comprise a truncated name of the application. The information identifying an application may comprise a version number of the application.

The PDU may include a header and a payload and wherein the information identifying an application that may be installed on the apparatus may be included in the payload.

The PDU may include a header and a payload, and wherein the indication that the PDU may include an application recommendation may be included in the payload.

The indication that the PDU may include an application recommendation may comprise one or more bits in an AD Type field of the payload. Here, the indication that the PDU may include an application recommendation may be an indication that the PDU may include an application identifier, or it may include an application recommendation may be an indication that the PDU may include an application name.

The indication that the PDU may include an application recommendation may be an indication that the PDU may include an application name along with a version identifier.

The advertising message may be a Bluetooth Low Energy Link Layer packet. Here, the PDU may be an ADV_NONCONN_IND PDU.

The apparatus may be configured to create the PDU in response to a user input constituting a request for an advertisement recommendation. The apparatus may be configured to broadcast the advertising message.

A second aspect of the invention provides apparatus configured:
  to receive an advertising message including a packet data unit [PDU] including information identifying an application that may be installed on another apparatus and an indication that the PDU may include an application recommendation; and
  to use the information identifying an application to provide an option to install the application.

The apparatus may be configured to use the information identifying an application to identify the application in an on-line application marketplace from which the apparatus can download and install applications.

A third aspect of the invention provides a method comprising:
  an apparatus creating an advertising message including a packet data unit [PDU] including information identifying an application that may be installed on the apparatus and an indication that the PDU may include an application recommendation; and
  the apparatus causing the advertising message to be broadcast.

The information identifying an application may comprise a unique identifier for the application. The information identifying an application may comprise a full name of the application or it may comprise a truncated name of the application. The information identifying an application may comprise a version number of the application.

The PDU may include a header and a payload and wherein the information identifying an application that may be installed on the apparatus may be included in the payload. The PDU may include a header and a payload, and wherein the indication that the PDU may include an application recommendation may be included in the payload.

The indication that the PDU may include an application recommendation may comprise one or more bits in an AD Type field of the payload. Here, the indication that the PDU may include an application recommendation may be an indication that the PDU may include an application identifier, or it may include an application recommendation may be an indication that the PDU may include an application name.

The indication that the PDU may include an application recommendation may be an indication that the PDU may include an application name along with a version identifier.

The advertising message may be a Bluetooth Low Energy Link Layer packet. Here, the PDU may be an ADV_NON-CONN_IND PDU.

The method may comprise the apparatus creating the PDU in response to a user input constituting a request for an advertisement recommendation.

The method may comprise the apparatus broadcasting the advertising message.

A fourth aspect of the invention provides a method comprising:
  an apparatus receiving an advertising message including a packet data unit [PDU] including information identifying an application that may be installed on another apparatus and an indication that the PDU may include an application recommendation; and
  the apparatus using the information identifying an application to provide an option to install the application.

The method may comprise the apparatus using the information identifying an application to identify the application in an on-line application marketplace from which the apparatus can download and install applications.

A computer program comprising instructions that when executed by a computer apparatus control it to perform the method above.

A fifth aspect of the invention provides a non-transitory computer-readable storage medium having stored thereon computer-readable code, which, when executed by computing apparatus, may cause the computing apparatus to perform a method comprising:
  creating an advertising message including a packet data unit [PDU] including information identifying an application that may be installed on the computing apparatus and an indication that the PDU may include an application recommendation; and
  causing the advertising message to be broadcast.

The information identifying an application may comprise a unique identifier for the application. The information identifying an application may comprise a full name of the application or it may comprise a truncated name of the application. The information identifying an application may comprise a version number of the application.

The PDU may include a header and a payload and wherein the information identifying an application that may be installed on the apparatus may be included in the payload. The PDU may include a header and a payload, and wherein the indication that the PDU may include an application recommendation may be included in the payload.

The indication that the PDU may include an application recommendation may comprise one or more bits in an AD Type field of the payload. Here, the indication that the PDU may include an application recommendation may be an indication that the PDU may include an application identifier, or it may include an application recommendation may be an indication that the PDU may include an application name.

The indication that the PDU may include an application recommendation may be an indication that the PDU may include an application name along with a version identifier.

The advertising message may be a Bluetooth Low Energy Link Layer packet. Here, the PDU may be an ADV_NON-CONN_IND PDU.

The computer-readable code when executed by the computing apparatus may cause the computing apparatus to perform creating the PDU in response to a user input constituting a request for an advertisement recommendation.

The computer-readable code when executed by the computing apparatus may cause the computing apparatus to perform broadcasting the advertising message.

A sixth aspect of the invention provides a non-transitory computer-readable storage medium having stored thereon computer-readable code, which, when executed by computing apparatus, may cause the computing apparatus to perform a method comprising:
  receiving an advertising message including a packet data unit [PDU] including information identifying an application that may be installed on another apparatus and an indication that the PDU may include an application recommendation; and
  using the information identifying an application to provide an option to install the application.

The computer-readable code when executed by the computing apparatus may cause the computing apparatus to perform using the information identifying an application to identify the application in an on-line application marketplace from which the apparatus can download and install applications.

A seventh aspect of the invention provides apparatus, the apparatus having at least one processor and at least one memory having computer-readable code stored thereon which when executed may control the at least one processor:
  to create an advertising message including a packet data unit [PDU] including information identifying an application that may be installed on the computing apparatus and an indication that the PDU may include an application recommendation; and
  to cause the advertising message to be broadcast.

The information identifying an application may comprise a unique identifier for the application. The information identifying an application may comprise a full name of the application or it may comprise a truncated name of the application. The information identifying an application may comprise a version number of the application.

The PDU may include a header and a payload and wherein the information identifying an application that may be installed on the apparatus may be included in the payload. The PDU may include a header and a payload, and wherein the indication that the PDU may include an application recommendation may be included in the payload.

The indication that the PDU may include an application recommendation may comprise one or more bits in an AD Type field of the payload. Here, the indication that the PDU may include an application recommendation may be an indication that the PDU may include an application identifier, or it may include an application recommendation may be an indication that the PDU may include an application name.

The indication that the PDU may include an application recommendation may be an indication that the PDU may include an application name along with a version identifier.

The advertising message may be a Bluetooth Low Energy Link Layer packet. Here, the PDU may be an ADV_NON-CONN_IND PDU.

The computer-readable code when executed may control the at least one processor to perform creating the PDU in response to a user input constituting a request for an advertisement recommendation.

The computer-readable code when executed may control the apparatus to perform broadcasting the advertising message.

An eighth aspect of the invention provides apparatus, the apparatus having at least one processor and at least one memory having computer-readable code stored thereon which when executed may control the at least one processor:

to receive an advertising message including a packet data unit [PDU] including information identifying an application that may be installed on another apparatus and an indication that the PDU may include an application recommendation; and to use the information identifying an application to provide an option to install the application.

The computer-readable code when executed may control the at least one processor to perform using the information identifying an application to identify the application in an on-line application marketplace from which the apparatus can download and install applications.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF VARIOUS EMBODIMENTS

Figure 1:
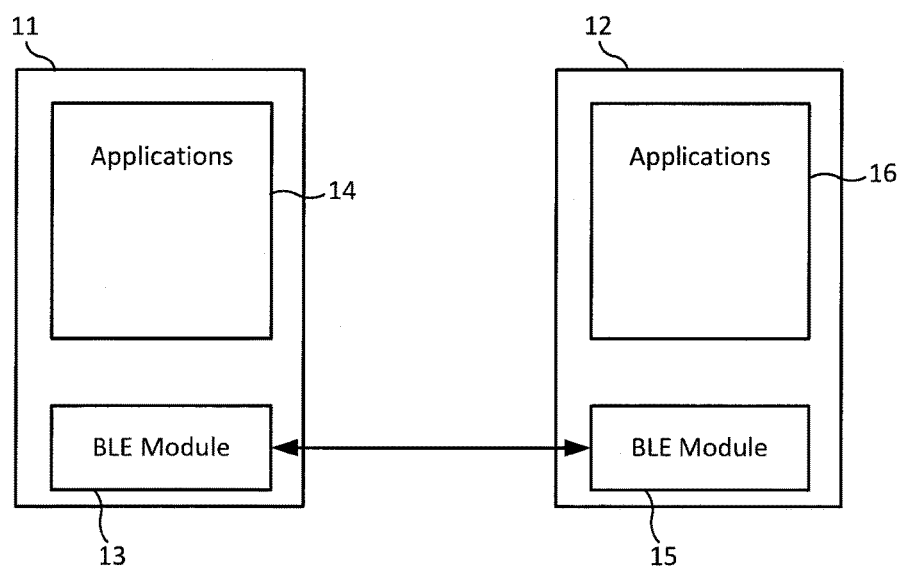
FIG. 1 is a schematic diagram of two devices that are used to discuss the general principle of embodiments of the invention.

In summary, embodiments of the invention provide for the creation and consumption of broadcast advertising messages that constitute application recommendations. The messages include information identifying an application that is installed on the origination apparatus and an indication that the PDU includes an application recommendation. The application recommendation advertising message is wirelessly broadcast by an advertiser or donor device, which may also be called a recommending device, and is received by one or more receiving or destination devices.

On receiving the application recommendation advertising message, the receiving device can provide the user of the device with an option to download and install the application with a small number of user inputs, possibly just one input.

By broadcasting the application recommendation advertising message, sharing of application recommendations is simplified for the user because the user of the recommending device does not need to identify recipients for the message. Also, multiple destination devices may be provided with the application recommendation advertising message with no additional input or work on the part of the recommending user or device.

Causing sending of the application recommendation advertising message can be made to be a simple process by suitable configuration of the recommending device. For instance, the recommending device may be configured to cause broadcast of the application recommendation advertising message in response to receiving a particular user input (e.g. a long press followed by a selection of a share option) in relation to an icon for the application that is being recommended.

By ensuring that the whole of the application recommendation advertising message in one packet data unit, the operation of receiving devices may be simplified. Additionally, the utilisation of radio resources may be minimised.

In the main embodiments that follow, Bluetooth Low Energy (BLE) is used to carry the application recommendation advertising messages. BLE is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

Bu using BLE to communicate application recommendations, recommendations can be made quickly and with very low power utilisation.

The following acronyms are used in the specification and have the meanings referred to:
BLE: Bluetooth Low Energy
LE: Low Energy
BT SIG: Bluetooth Special Interest Group
GAP: Generic Access Profile
RFU: Reserved for Future Use
AD: Advertising
AI: Application Identifier
AN: Application Name
AV: Application Version FIG. 1 shows a system according to embodiments of the invention. The system 10 includes a first device 11 and a second device 12. The first device 11 includes a BLE module 13, which operates according to the BLE standard. The second device 12 includes its own BLE module 15. The BLE module 15 also operates according to the BLE standard.

The mobile devices 11, 12 may be mobile phones, smart phones, tablet computers, laptop computers etc. The mobile devices 11, 12 may be based around any suitable operating system, for instance Symbian, Windows Phone 8 or Android, although any other operating system may instead be used. The devices 11, 12 may run different operating systems or they may run the same operating system.

Generally speaking, the devices 11, 12 comprise processing circuitry, including one or more processors, and a storage device, comprising a single memory unit or a plurality of memory units. The storage device stores computer program instructions that, when loaded into the processing circuitry, control the operation of the device.

The BLE modules 13, 15 may take any suitable form. Generally speaking, the BLE modules 13, 15 comprise processing circuitry, including one or more processors, and a storage device comprising a single memory unit or a plurality of memory units. The storage device stores computer program instructions that, when loaded into the processing circuitry, control the operation of the BLE modules 13, 15. The BLE modules 13, 15 each include a communication stack that is implemented at least partly in software using processor and memory resources, all of which are included within the BLE modules 13, 15.

Each of the first and second devices 11, 12 includes a respective collection of installed applications 14, 16. Each application within the collections 14, 16 is installed in the respective device 11, 12 according to the requirements of the operating system running on the device 11, 12.

FIG. 1 illustrates an overview of principles of embodiments of the invention. A user of the first device 11 can want to recommend or share an application from the collection of applications 14 that are installed on the first device 11. The user enters through a user interface provided by the first device 11 that they want to make or provide an application recommendation by BLE. In response, the first device 11 prepares an advertising message including a packet data unit (PDU) including information identifying the application that the user wants to share and an indication that the PDU includes an application recommendation. The first device 11 then transmits the advertising message by broadcasting it as a BLE advertising message.

On receiving the broadcast advertising message, the second device 12 identifies the recommended application and provides a notification through a user interface of the second device 12. The notification includes an option to download and install the recommended application. The notification may also include an option to view more details about the application, selection of which by the user leads to more information and options to cancel and to download and install.

The second device 12 may operate in the same way as the first device 11.

The latest version of the BLE specification defines three advertising channels, which serve for device discovery and other broadcasting purpose.

The PDU that is prepared and transmitted by the first device 11 is in these embodiments an ADV_NONCON-N_IND PDU, which is an advertising PDU type that is defined in the BLE specification, although it may take some other form of advertising PDU or non-advertising PDU.

Figure 2:
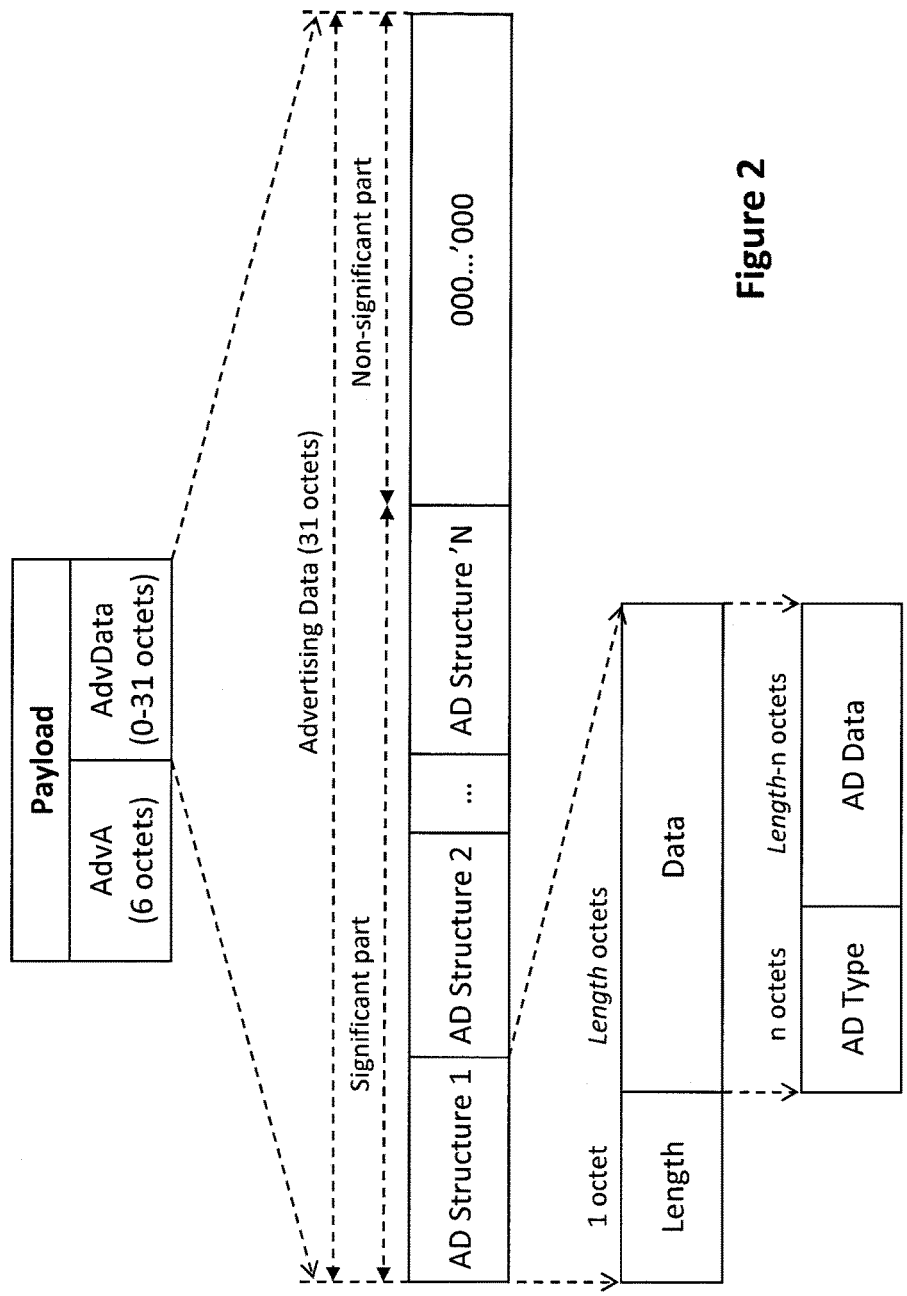
FIG. 2 presents an Advertising Data format used in embodiments of the invention.

The ADV_NONCONN_IND PDU includes two main sections. The first is the header, and the second is the payload. The header here has 16 bits (two octets). The payload has a length that is between zero and 37 octets, as per the length field in the header part of the PDU. The payload is shown in FIG. 2.

The payload section of the ADV_NONCONN_IND PDU includes two main fields. The first is six octets long and is called AdvA. The second part is between zero and 31 octets long and is called AdvData.

The AdvData part of the payload will now be described with reference to FIG. 2. FIG. 2 shows the Generic Access Profile (GAP) Advertising Data format. The payload of an advertising PDU includes AdvA and AdvData fields. The AdvData field, when applied to GAP, has a fixed length of 31 octets. The AdvData field falls into two parts, a significant part and a non-significant part, both of which are shown in FIG. 2. The significant part carries the advertising data and is encapsulated within multiple AD Structures. The non-significant part is all zero bits, that is it includes no information.

In the significant part, each AD Structure contains a Length field and a Data field. Each Data field further contains AD Type and AD Data. Definitions of the AD Type and AD Data fields can be found in the Bluetooth Assigned Numbers document that is available at https://www.bluetooth.org/technical/assignednumbers/home.htm at the time of writing.

Each AD Structure is formed of two fields, namely a Length field and a Data field. The Length field here is one octet in size. The Data field has a length that is defined by the data included in the Length field. In the Data field, there is provided an AD Type field and an AD Data field.

The AD Type field is populated with the value for the appropriate application recommendation AD Type, the options for which are discussed below.

The AD Data field is populated with the information identifying the application, the options for which are discussed below.

In these embodiments, three new AD Types are provided. The details of these AD Types follows:

| Value | Description | Information |
|---|---|---|
| 0x20 | Application Identifier (AI) (n octets) | The AI is a unique identifier for the application, which may be package name, unique identity number, etc. |
| 0x21 | Application Name (AN) (n octets) | The AN is a user-friendly identifier of the application and may not be unique. |
| 0x22 | Application Version (AV) (n octets) | The AV is an auxiliary identifier of the application. |

The values of the AD Types given here are OX20, OX21 and OX22 as examples, although they may take some other reserved values. The example values are referred to in the following explanation, but these values are not limiting.

The appropriate AD Type is included in the message in the manner shown in FIG. 2. In particular, the significant part includes a first AD Structure named AD Structure 1. Other AD Structures may follow the first AD Structure. Multiple AD Structures can be included in the significant part, each of which contains its own information. As explained below, in these embodiments either one or two AD Structures are included in an application recommendation PDU.

Because the length of the AD Structure 1 field is variable, and is set by the data included in the Length field, the length of the AD Data field may vary. In this example, the length of the AD Data field is dictated by the data that is required to be included in the PDU, and the value in the Length field varies accordingly.

The maximum length of the AD Data field is 29 octets. This is calculated as 31 octets for the payload minus 2 octets for the AD Type, and allows only one AD Structure to be included.

Operation of the devices 11, 12 when sharing an application recommendation will now be described with reference to FIGS. 3 and 4.

In the following example, the first device 11 is the recommending device and the second device 12 is the destination device. FIG. 3 relates to operation of the recommending device 11 and FIG. 4 relates to operation of the destination device 12.

Figure 3:
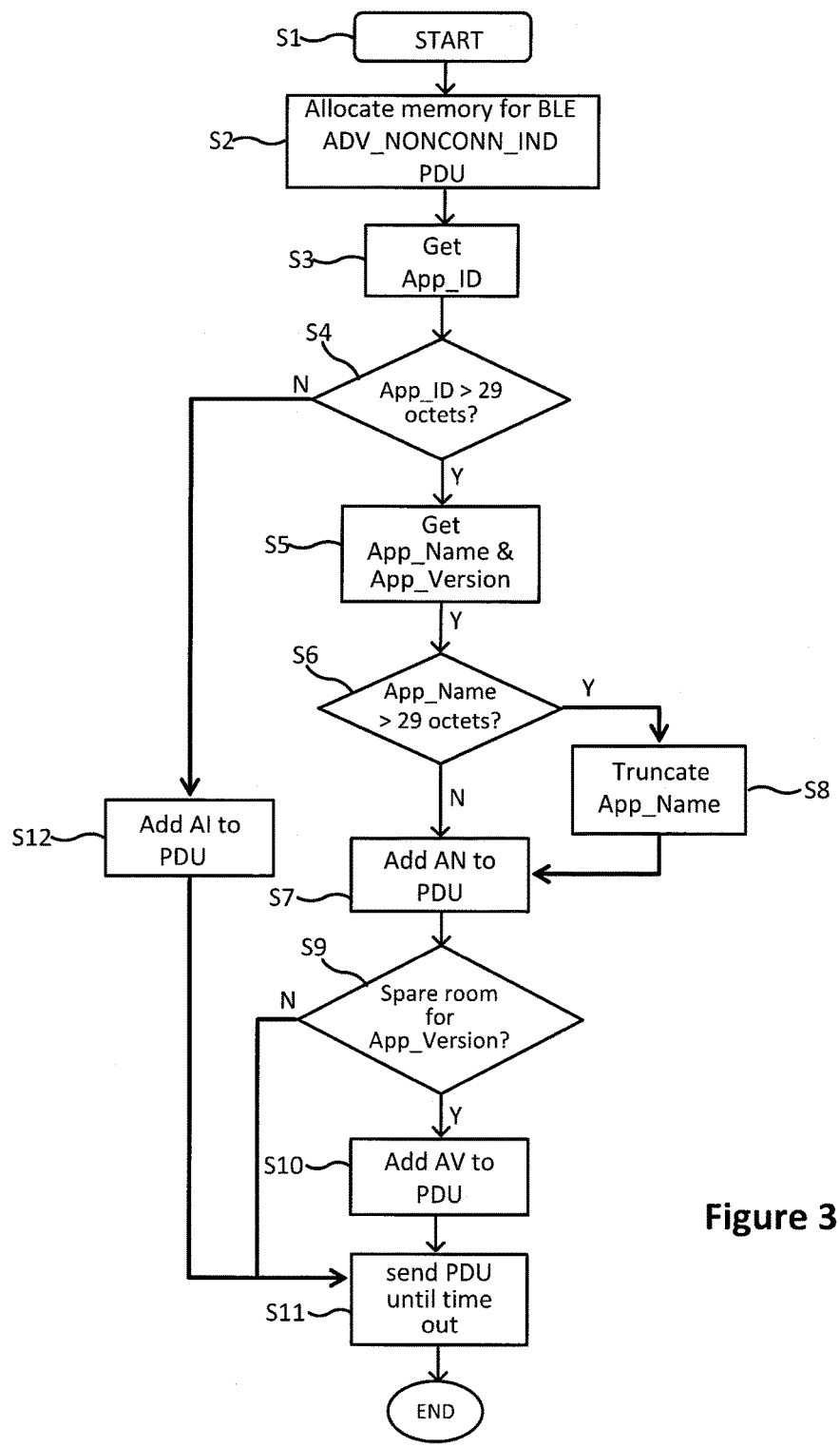
FIG. 3 is a flow chart illustrating operation of a device operating as a recommender.

Starting with the recommending device 11, the operation of FIG. 3 starts at step S1. The operation of FIG. 3 commences when the user indicates to the device 11 that they require to share a recommendation of an application by BLE. This can occur for instance in response to the user providing a long press on an icon for the application, which may for instance be in a list of installed applications or may be a page for the application in an application store or marketplace, and selecting an option to recommend via BLE in the menu that is provided by the device 11 after detecting a long press. Alternatively, FIG. 3 may start at step S1 in response to the user providing a user input to drag the icon representing the application off of the screen of the device 11 (at a low level, by making a touch input at the location of the icon for a duration that is shorter than the duration at which a long press is determined and then moving the position of the input off an edge of the area of the screen), or any other configured user input.

At step S2, memory is allocated for the BLE application recommendation advertising message. At step S3, the identifier for the application (Application Identifier) that is to be recommended is obtained. For Windows Phone 8, the Application Identifier (AI or App_ID parameter) is the PFN (Package Family Name). For Android, the Application Identifier can be the application's package name, which is declared in the application's manifest file. For other operating systems, the Application Identifier may take some other form. The value for the parameter can be obtained by the operating system of the recommending device 11 through various system calls that depend on the particular operating system being run on the recommending device 11. In the following, Application Identifier is the value of the App_ID parameter.

In step S4, it is determined whether the Application Identifier can be included in a single PDU. In the case of using a BLE ADV_NONCONN_IND PDU, this involves determining whether the Application Identifier has a length that is greater than 29 octets. 29 octets is the limit of the size of the AD Data field, as discussed above.

On a positive determination from step S4, at step S5 the recommending device 11 obtains the Application Name (AN or App_Name parameter value) and Application Version (AV or App_Version parameter value). The values of these parameters can be obtained by the operating system of the recommending device 11 through various system calls that depend on the particular operating system being run on the recommending device 11. In the following, Application Name is the value of the App_Name parameter and Application Version is the value of the App_Version parameter.

At step S6, it is determined whether Application Name has a length greater than 29 octets. On a negative determination, the operation proceeds to step S7, where the Application Name is added to the PDU. On a positive determination from step S6, the Application Name is truncated to 29 octets at step S8. Truncation involves discarding the characters of the Application Name that are not completed by the first 29 octets of the parameter. Following step S8, the truncated Application Name is added to the PDU at step S7.

Following step S7, at step S9 it is determined by the recommending device 11 whether there is space or room in the PDU for the Application Version. This is performed by determining whether the sum of the length of the App_Name parameter and the length of the App_Version parameter exceeds 29 octets. If it does not, it is determined that there is room for the Application Version in the PDU, and the operation proceeds to step S10. Here the Application Version is added to the PDU.

If it is determined at step S4 that the length of the App_ID parameter is less than 29 octets, at step S12 the Application Identifier is added to the PDU.

Following step S10, or a negative determination from step S9, or following step S12, messages including the PDU are transmitted until a timeout occurs at step S11.

The PDU includes the AD Structure(s) discussed above and a non-significant part comprised of zeros to fill the entire 31 octet AdvData field.

Step S11 involves the processor of the recommending device 11 instructing the BLE module 13 to transmit the PDU by broadcasting it. Each message includes the same PDU. Messages are transmitted a number of times within an advertising period. For instance, messages may be transmitted at an interval advInterval that is equal to a random value within the range 20 ms to 50 ms, for an advertising period of 1 second.

It will be appreciated from analysis of the operation of FIG. 3 that the PDU includes data that depends on a number of factors, notably the lengths of certain parameters. If the App_ID parameter has a length that is sufficiently short that the Application Identifier can be included in the PDU, this occurs at step S12. If, however, the length of the App_ID parameter is so long that it cannot be included in a PDU, the Application Name is included in the PDU at step S7. In this case, the Application Version may or may not be included in the PDU. In this example, the Application Version is included in the PDU if the length of the App_Name parameter is sufficiently short that there is available space in the PDU for the Application Version. If there is not sufficient room, then the PDU includes only the Application Name, as defined by the App_Name parameter. Only one of the Application Identifier and the Application Name is included in the PDU, not both.

Since the Application Identifier, as defined by the App_ID parameter, is unique to the application, this parameter is given a higher priority and is included in the PDU if there is sufficient space in the PDU. Only if there is insufficient space for the Application Identifier is the Application Name, as defined by the App_Name parameter, included in the PDU. Since the Application Name, and particularly the first 29 octets of the name if it is truncated at step S8, may not be unique, the inclusion of the Application Name in the PDU may not result in unambiguous identification of an application in the store or marketplace. The inclusion of the Application Version, as defined by the App_Version parameter may serve to disambiguate if there are multiple applications that include the same Application Name, if the Application Name is sufficiently short that the Application Version can be included in the PDU and if only one of the possible applications has a version history that is consistent with the Application Version.

In the case of a PDU that includes only the Application Identifier, only one AD Structure is included in the advertising data section of the PDU. The same applies in the case of a PDU that includes only the Application Name. In the case of a PDU that includes an Application Name and an Application Version, the PDU is provided with first and second AD Structures. Here, the first AD Structure relates to the Application Name, and includes an AD Type that identifies the Structure as including the Application Name, and a second AD Structure relating to the Application Version, and including an AD Type indicating that the Structure relates to the Application Version. In the case of a PDU with only one AD Structure, the value in the AD Type field indicates the contents or the AD Data field of the sole AD Structure.

The provision of data in the AD Type field indicating that the PDU includes an Application Identifier constitutes an indication that the PDU includes an application recommendation. The provision of data in the AD Type field indicating that the PDU includes an Application Name constitutes an alternative indication that the PDU includes an application recommendation. As such, there are two different AD Type values that could indicate that the PDU includes an application recommendation. The value of AD Type that indicates that the data structure includes an Application Version is a further indication that the PDU includes an application recommendation, although in the above-described example the AD Type indicating an Application Version is included only in PDUs that also include an AD Type indicating that the PDU includes an Application Name.

The Application Identifier constitutes information identifying the application, the application being one that is in the collection of applications 14 installed on the recommending device 11. The Application Name also constitutes information identifying the application that forms part of the collection of applications 14 and is installed on the recommending device 11. The Application Version information is information that further identifies the application.

Operation of the destination device 12 will now be described with reference to FIG. 4.

Operation starts at step S1. The operation may be triggered by a user of the destination device 12 selecting an option to enable BLE scanning. Whilst in scanning mode, the BLE module 15 of the destination device 12 monitors for packets transmitted in advertising channels. Scanning is illustrated in FIG. 4 at step S2.

When an advertising PDU is received at step S3, the operation proceeds to step S5. If no advertising PDU is received at step S3, it is determined at step S4 whether a scanning timeout has expired. On a negative determination, the operation returns to step S2 where BLE advertising scanning is continued. Upon step S4 determining that the scanning timeout has expired, the operation ends at step S15.

After an advertising PDU has been received, at step S5 it is determined whether the PDU is an ADV_NONCONN_IND PDU. On a negative determination, the destination device 12 performs normal or general PDU processing at step S6. This is outside the scope of the specification and so is not described here. Following step S6, the operation proceeds to step S4, where it is determined whether the scanning timeout has occurred.

The value of the timer used in the scanning timeout at step S4 may take any suitable value. For instance, it may be ten seconds. The provision of a timeout on the scanning period prevents the scanning for PDUs being performed potentially indefinitely.

If step S5 reveals that an ADV_NONCONN_IND PDU has been received, it is determined at step S7 whether the PDU includes an Application Identifier. This is determined by detecting the value in the AD Type field of the first AD Structure in the PDU and determining whether the value indicates the presence of an Application Identifier in the AD Structure, or in another AD Structure in the PDU. In the above, the value indicating the presence of an Application Identifier is OX20.

On a negative determination, at step S8, the destination device 12 determines whether the PDU includes an Application Name. This is performed by determining whether the value in an AD Type field in one of the AD Structures in the PDU indicates that the AD Structure includes the name of an application. In the above, the value indicating the presence of an Application Name is OX21.

Following a negative determination from step S8, general PDU processing is performed at step S6.

The inclusion of steps S5 to S8 ensures that any advertising PDUs that are not ADV_NONCONN_IND PDUs are processed in the normal way, and also that any ADV_NON-CONN_IND PDUs that do not indicate the presence of an Application Identifier or an Application Name, so do not indicate an application recommendation, are processed in the normal way.

If it is determined at step S8 that an Application Name does exist in the PDU, the Application Name is retrieved from the PDU at step S9. In particular, it is retrieved from the AD Data field of the AD Structure including the value OX21 in the AD Type field.

At step S10, it is determined whether Application Version exists in the PDU. This is performed by examining the AD Type fields of the AD Structures included in the PDU and determining whether the value of any of the data in the AD Type fields indicates OX22. On a positive determination, the Application Version is retrieved from the AD Data part of the appropriate AD Structure at step S11.

If it is determined at step S7 that an Application Identifier exists in the PDU, at step S14 the Application Identifier is retrieved from the PDU. In particular, this involves extracting the data from the AD Data field of the AD Structure that includes the value OX20 in the AD Type field.

Following step S11 or step S14 or following a negative determination from step S10, a link to the recommended application is generated at step S12. This can be performed in any suitable way that is appropriate to the operating system that is running on the destination device 12.

For a Windows Phone device where the Application Identifier is received in the PDU, step S12 involves generating a link with the URL ms-windows-store: PDP?PFN=<AI>

With a Windows Phone device where the Application Identifier is not received in the PDU, this involves generating a link to a search result having the form ms-windows-store: Search?query=<AN+(AV)>

Details for how to create a link to an application in Windows Phone are currently provided at the following location http://msdn.microsoft.com/en-us/library/windows/apps/hh974767.aspx For Android devices, step S12 involves, for PDUs that include the Application Identifier, generating a link with the following format market://details?id=<AI>

Where the PDU includes the Application Name but not the Application Identifier, the generation of a link to the application involves generating a search query URL having the following form market://search?q=<AN+(AV)>

Details for how to create a link to an application in Android are currently provided at the following location http://developer.android.com/distribute/googleplay/promote/linking.html#PerformingSearch In the above, AI denotes the value of the App_ID parameter (the Application Identifier) and AN denotes the value of the App_Name parameter (the Application Name). AV denotes the value of the App_Version parameter (the Application Version) and is included in the link only if it is was received in the PDU and thus is known.

After a link to the application has been created, the destination device 12 navigates to the URL denoted by the link and provides a user notification at step S13. As discussed above, the notification includes an option to download and install the recommended application, which is the application identified in the PDU. The notification may include text such as "App recommendation received from <recommender's name or device identifier> of <Application Name> <Application Version>". The notification may also include an option to view more details about the application, selection of which by the user leads to more information and options to cancel and to download and install the application.

Figure 4:
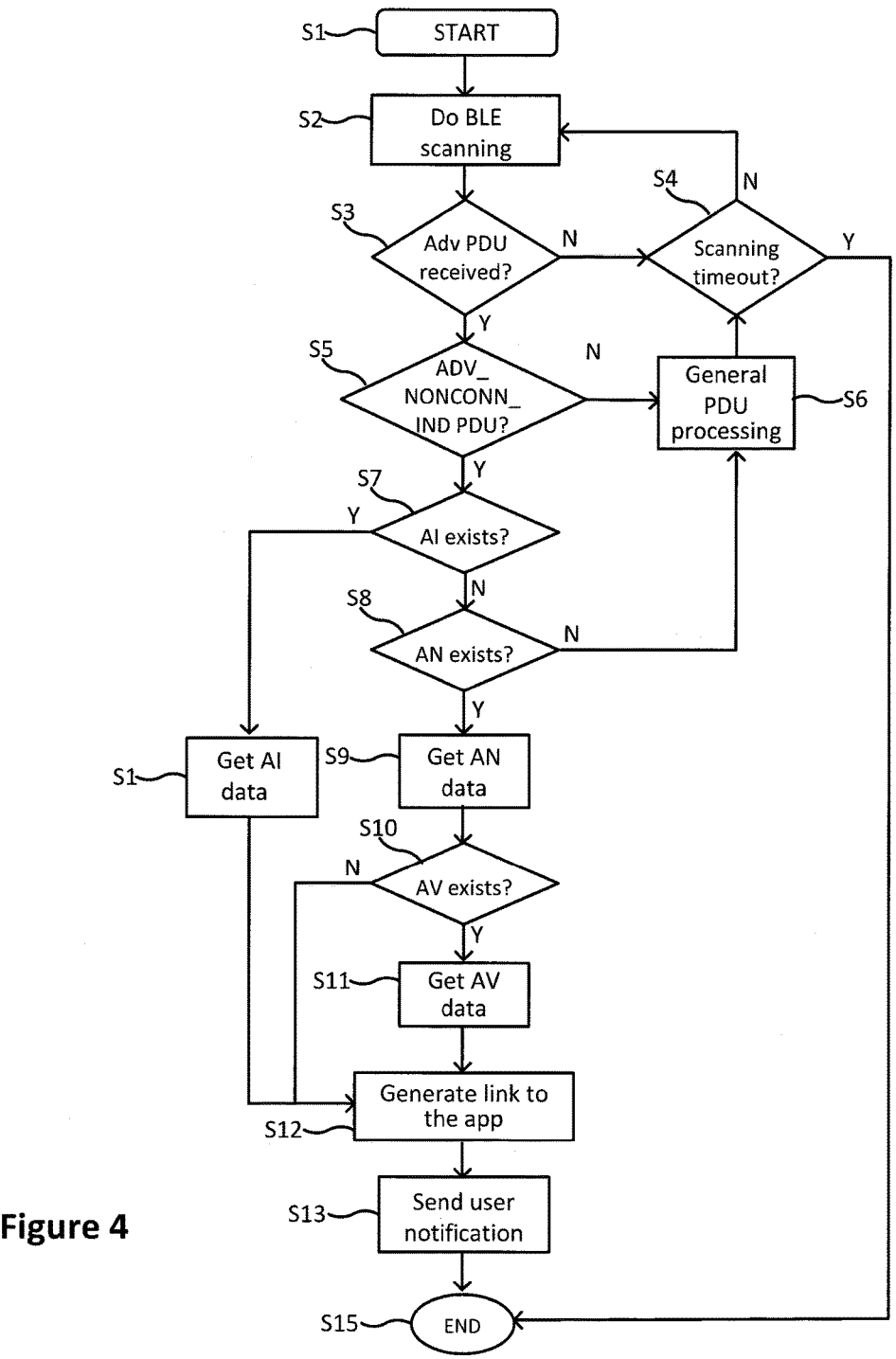
FIG. 4 is a flow chart illustrating operation of a device operating as a receiver or destination.

If after step S13 of FIG. 4 the user of the destination device 12 provides a user input to download and install the application, the application becomes part of the collection of applications 16 that are installed on the destination device 12.

Following step S13, the operation ends at step S15.

Although not shown in FIG. 4, the performance of step S12 and step S13 may be conditional on the destination device 12 recognising the recommending device 11 as a trusted device. This may be performed in any suitable way. For instance, it may be performed by determining whether the recommending device 11 and the destination device 12 have been paired previously. Alternatively, it may be dependent on the data in the advertising message that identifies the sender, in this case the recommending device 11, being included in a list of trusted devices within a memory of the destination device 12. This may involve the addressing convention described in co-pending application number PCT/CN2012/078599.

Configuration of the recommending device 11 and the destination device 12 to perform the operations of FIGS. 3 and 4 respectively may require changes to the stacks in the BLE modules 13, 15.

It will be appreciated that the correct operation of the application recommendation operations is not dependent on the devices 11, 12 running the same version of the same operating system or even running the same operating system. The PDU is operating system neutral, put another way it is not dependent on the operating system. As long as the information included in the PDU allows the marketplace or store that is accessed by the destination device 12 to identify the application, the destination device 12 and its user can benefit from the application recommendation by the recommending device 11.

Figure 5:
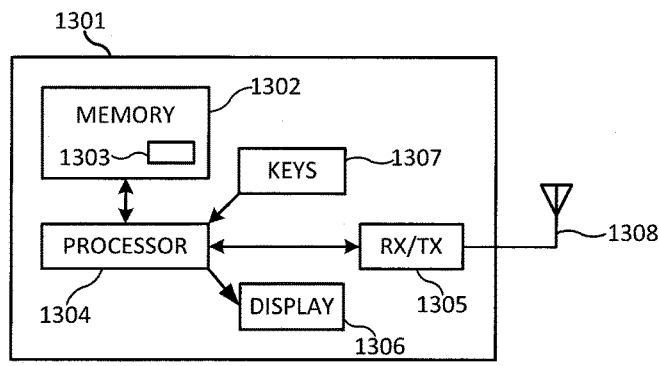
FIG. 5 is a schematic diagram of a Bluetooth device that may form one of the devices of FIG. 1.

FIG. 5 shows an example embodiment of a BLE-equipped device which may constitute the device 11 or the device 12. BLE-equipped device 1201 contains computer code in an executable form 1303 in the memory unit 1302, which may comprise RAM and/or ROM. Memory unit 1302 is connected to one or more processors 1304 on which the instructions are executed.

Messages including PDUs are transmitted and received using a transceiver 1305. Transceiver 1305 is connected to an antenna 1308 for transmitting and receiving packets from another Bluetooth device. The transceiver 1305 is the BLE modules 13, 15 of FIG. 1.

A display 1306 is connected to the processor. Messages are presented to a user of the device 1201 by the processor 1304 causing them to be displayed on the display 1306. Input keys 1307 are provided. The input keys 1307 allow a user to enter information into the device 1201. The input keys 1307 may be hardware keys and/or may be soft or virtual keys provided by a touch screen display or the like. Information can include selection of an option as well as information such as a text.

Figure 6:
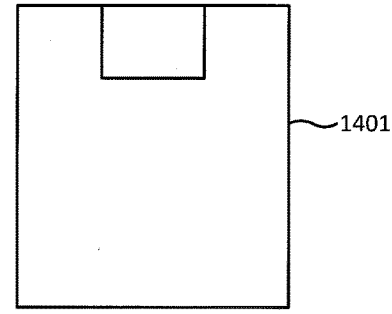
FIG. 6 shows an example embodiment of a tangible memory media.

FIG. 6 shows an example embodiment of a tangible memory media. Media 1401 may be a tangible storage media according to the present invention having program content. Media 1401 may be any form of storage media such as magnetic, solid state, optical media, and/or the like.

Figure 7:
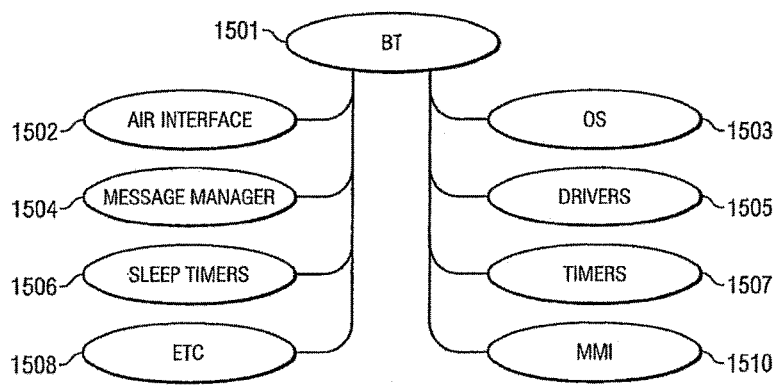
FIG. 7 shows software of an example embodiment of a Bluetooth device that may form one of the devices of FIG. 1.

FIG. 7 shows a software SW view of an example embodiment of a BLE-equipped device. This figure shows an example of the main software components that may be implemented on such an apparatus or device.

In this software SW of the apparatus has an operating system OS 1503 and hardware HW drivers 1505. The OS timers used by the OS functions are shown in 1507. The man machine interface MMI, which may be a single button or several buttons, is shown in 1510. This utilises the display 1306 and the keys 1307.

The interface specific components are a BLE radio interface protocol control stack 1501, an actual air interface 1502 which is controlled by the drivers 1505 to select RX or TX, and a message manager 1504 which controls the BLE message structures and queues.

Further, the apparatus may comprise at least a sleep timer 1506. Timers 1507 may be used to schedule scan and advert broadcast activities, as described above with reference to FIGS. 3 and 4. The apparatus may comprise other SW components 1508, for example a BLE profile manager. The BLE profile manager may manage the mode the device is in, define additional messages it may be expected to provide or respond too, etc. A device may be simple and have only one profile. Alternatively, a device may be more complex and have or support several profiles.

The apparatus may comprise further optional SW components which are not described in this specification since they may not have direct interaction to embodiments of the invention.

Embodiments of the present invention may be implemented in software, hardware, application logic or a combination of software, hardware and application logic. The software, application logic and/or hardware may reside on memory 1302, or any computer media of which an example is shown as 1401. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5.

A computer-readable medium, as depicted in FIG. 6, may comprise a computer-readable storage medium that may be any tangible media or means that can contain or store the instructions for use by or in connection with an instruction execution system, apparatus, or device, such as a computer as defined previously.

If desired, the different functions discussed herein may be performed in a different order and/or concurrently with each other. Furthermore, if desired, one or more of the above-described functions may be optional or may be combined.

Aspects of the invention provide a number of advantages. A first advantage is that both of the embodiments described above are fully compatible with the BLE specification version 4.0. As such, implementing the embodiments is backward compatible with previous versions of the BLE specification.

The above-described embodiments are seen as having a broad prospect for social applications.

Moreover, the advantages are achieved in the embodiments with a relatively low complexity and with a relatively low overhead of data communication for utilisation of hardware resources.

Although the embodiments are described with reference to Bluetooth Low Energy, it will be appreciated that the concepts may be applicable to other communication protocols. For instance, other embodiments of the invention relate to versions of Bluetooth that are not concerned with the Bluetooth Low Energy aspect of the Bluetooth standard. In some embodiments, non-low energy Bluetooth (e.g. version 3, or even version 1 or version 2) is used as the bearer communication protocol. Here, application recommendation PDUs are broadcast by apparatus acting as a Bluetooth advertiser, so that it application recommendations can be obtained by other Bluetooth scanner devices.

Other embodiments relate instead to other communication protocols, which may take any suitable form of wireless protocol, whether radio, optical or other. In some embodiments, wi-fi (IEEE 802.11) is used as the bearer communication protocol.

Here, application recommendation PDUs are broadcast by apparatus acting as a wi-fi beacon, so that it application recommendations can be obtained by wi-fi scanner devices.

All of the above embodiments involve broadcast of advertising messages, that is the messages are not addressed to any device or group of devices.

All of the above-described embodiments involve the sending of application recommendation messages directly, that is there is no network intervening the broadcast transmission medium (e.g. BLE module) and the apparatus that creates the PDU.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

The computer program instructions may arrive at the apparatus via an electromagnetic carrier signal or be copied from a physical entity such as a computer program product, a memory device or a record medium such as but not exclusively a CD-ROM or DVD, and/or an article of manufacture that tangibly embodies the computer program.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

Where computer code or software is executed, this is performed by one or more processors acting under an operating system. The operating system and the software are stored in nob-volatile memory, such as ROM, Flash, optical storage, magnetic storage etc., and stored temporarily along with data in volatile memory, such as RAM, DRAM, SDRAM, Flash etc., during execution.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
creating, by an apparatus, an advertising message including a packet data unit [PDU] including information identifying an application that is installed on the apparatus and an indication that the PDU includes a recommendation of an application to download from an entity other than the apparatus; and
causing, by the apparatus, the advertising message to be broadcast.

2. A method as claimed in claim 1, wherein the information identifying an application comprises at least one of:
a) a unique identifier for the application,
or
b) a full name of the application,
or
c) a truncated name of the application,
or
d) a version number of the application.

3. A method as claimed in claim 1, wherein the PDU includes a header and a payload and wherein the information identifying an application that is installed on the apparatus is included in the payload.

4. A method as claimed in claim 1, wherein the PDU includes a header and a payload, and wherein the indication that the PDU includes an application recommendation is included in the payload.

5. A method as claimed in claim 1, wherein the indication that the PDU includes an application recommendation comprises one or more bits in an AD Type field of the payload.

6. A method as claimed in claim 1, wherein the indication that the PDU includes an application recommendation is an indication that the PDU includes at least one of the following:
a) an application identifier,
or
b) an application name,
or
c) an application name along with a version identifier.

7. A method as claimed in claim 1, wherein the advertising message is a Bluetooth Low Energy Link Layer packet.

8. A method as claimed in claim 1, wherein the PDU is an ADV_NONCONN_IND PDU.

9. An apparatus, the apparatus having at least one processor and at least one memory having computer-readable code stored thereon which when executed controls the apparatus:
to create an advertising message including a packet data unit [PDU] including information identifying an application that is installed on the apparatus and an indication that the PDU includes a recommendation of an application to download from an entity other than the apparatus; and
to cause the advertising message to be broadcast.

10. Apparatus as claimed in claim 9, wherein the information identifying an application comprises at least one of:
a) a unique identifier for the application,
or
b) a full name of the application,
or
c) a truncated name of the application,
or
d) a version number of the application.

11. Apparatus as claimed in claim 9, wherein the packet data unit [PDU] includes at least one of:
a) a header and a payload and wherein the information identifying the application that is installed on the apparatus is included in the payload, or b) a header and a payload, and wherein the indication that the packet data unit [PDU] includes an application recommendation is included in the payload, or c) a header and a payload, and wherein the indication that the packet data unit [PDU] includes an application recommendation is indication that the PDU includes an application name.

12. Apparatus as claimed in claim 9, wherein the indication that the PDU includes an application recommendation comprises one or more bits in an AD Type field of the payload.

13. Apparatus as claimed in claim 9, wherein the indication that the PDU includes an application recommendation is an indication that the PDU includes at least one of the following:

a) an application identifier, or b) an application name, or c) an application name along with a version identifier.

14. A non-transitory computer-readable storage media having stored thereon computer-readable code, which when executed by a processor, causes an apparatus at least to:

create an advertising message including a packet data unit [PDU] including information identifying an application that is installed on the apparatus and an indication that the PDU includes a recommendation of an application to download from an entity other than the apparatus; and broadcast the advertising message.

15. Non-transitory computer-readable storage media as claimed in claim 14, wherein the information identifying an application comprises at least one of:

a) a unique identifier for the application, or b) a full name of the application, or c) a truncated name of the application, or d) a version number of the application.

16. Non-transitory computer-readable storage media as claimed in claim 14, wherein the PDU includes a header and a payload and wherein the information identifying an application that is installed on the apparatus is included in the payload.

17. Non-transitory computer-readable storage media as claimed in claim 14, wherein the PDU includes a header and a payload, and wherein the indication that the PDU includes an application recommendation is included in the payload.

18. Non-transitory computer-readable storage media as claimed in claim 14, wherein the indication that the PDU includes an application recommendation comprises one or more bits in an AD Type field of the payload.

19. Non-transitory computer-readable storage media as claimed in claim 14, wherein the indication that the PDU includes an application recommendation is an indication that the PDU includes at least one of the following:

a) an application identifier, or b) an application name, or c) an application name along with a version identifier.

20. Non-transitory computer-readable storage media as claimed in claim 14, wherein the advertising message is a Bluetooth Low Energy Link Layer packet.

* * * * *